UNITED STATES PATENT OFFICE.

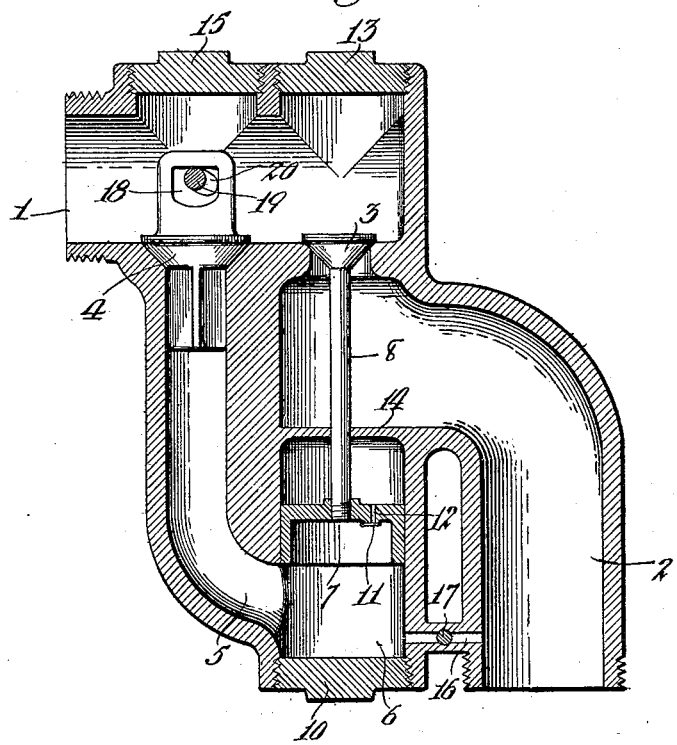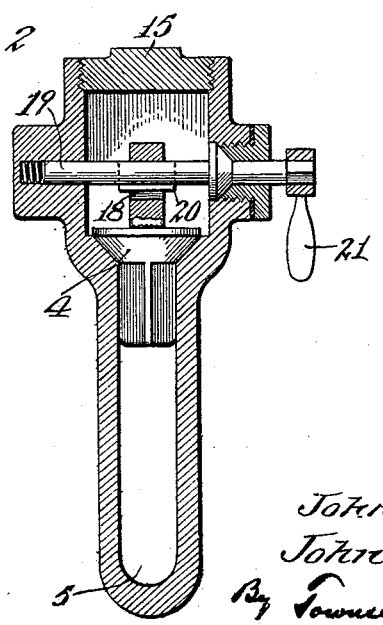

JOHN L. WILLIAMS AND JOHN C. STURGEON, OF LOS ANGELES, CALIFORNIA.

FLUSHING-VALVE.

992,315.  Specification of Letters Patent.  Patented May 16, 1911.

Application filed March 9, 1910. Serial No. 548,314.

*To all whom it may concern:*

Be it known that we, JOHN L. WILLIAMS and JOHN C. STURGEON, both citizens of the United States, residing at Los Angeles, in the county of Los Angeles and State of California, have invented a new and useful Flushing-Valve, of which the following is a specification.

This invention relates to flushing valves and the main object of the invention is to provide a valve of this character which may be located directly in the service pipe without requiring the use of a tank.

Other objects of the invention are to provide a valve of this character which is of extremely simple and economical construction, perfect in operation and of great durability.

Referring to the drawings: Figure 1 is a vertical section through the device. Fig. 2 is a vertical, sectional view through the controlling valve.

1 designates the inlet passage which communicates with a discharge passage 2 through a main valve 3. The main valve 3 is operated indirectly by a controlling valve 4, the latter being normally closed and shutting off communication between the inlet passage 1 and a branch passage 5 which leads to a cylinder 6 in which is a piston connected by a stem 8 with the main valve 3, the stem 8 passing through a plate 14 forming the upper end of the cylinder 6, the lower end of cylinder 6 having a removable screw plug 10 giving ready access to the interior of the cylinder and piston. The piston 7 has a check valve 11 which controls a small passage 12 through the piston, acting to allow water to flow down through the passage 12 into the cylinder 6 but preventing its passage in the other direction. A screw plug 13 is arranged above the valve 3. The upward movement of the valve is limited by the piston which carries same coming into contact with the partition 14. The partition 14 has the further function of diverting the water so that it does not strike the top of the piston 7 and close the valve 3. The cylinder 6 and screw plugs 10 and 13 and also the valve seat for the valve 3 are all in line with each other, thereby permitting accurate and economical construction and enabling the cylinder and valve seat to be readily ground true, which is necessitated when glass is employed as the material. Above the valve 4 is a screw plug 15 which is in line with the seat of the valve 4 and enables the seat to be readily ground. A passage 16 leads from the lower end of cylinder 6 to the outlet 2 and is provided with a valve 17, whereby the flow of water through pipe 16 may be regulated.

The valve 4 is provided with a slot 18 and a shaft 19 extends therethrough and through the walls of the passage 1, the shaft 19 having a lug 20 which is located in the slot 18, so that when the shaft 19 is turned the lug 20 will act upon the upper wall of the slot 18 and lift the valve 4, the shaft 19 being operated by a suitable handle 21 which may be connected to either end of the shaft 19 at either side of the valve.

The parts normally stand as follows: The main valve 3 is closed, thereby preventing water from passing from the inlet passage 1 to the outlet passage 2 and the valve 4 is also closed, preventing water from passing from the inlet passage 1 to the by-passage 5. When the handle 21 is operated, the valve 4 is lifted, which permits water to enter the by-passage 5 and upon entering the cylinder 6 the water lifts the piston 7, thereby raising valve 3. The valve 3 is of less area than the piston 7, so that the piston 7 exerts a greater pressure than the valve and thus lifts it. Upon the handle 21 being released, the valve 4 drops to its seat, but the water which has entered the cylinder 6 holds the piston 7 elevated and maintains the valve 3 in open position, during which time the water under pressure flows directly from the inlet passage 1 to the outlet passage 2. Water which has entered the cylinder 6 also passes away therefrom slowly through pipe 16 into the discharge passage 2 and gradually permits the piston 7 to lower, thereby gradually moving the valve 3 toward its seat and the valve 17 should be so adjusted that the water will be retained in cylinder 6 in sufficient quantity for a sufficient time to hold the valve 3 open long enough for the required volume of water to flow from the inlet passage to the outlet passage for flushing purposes and after that has been accomplished the water within cylinder 6 will have entirely flowed out therefrom and will have permitted the piston 7 to lower and valve 3 to close.

During the time that the valve 3 is open, the partition 14 and check valve 11 prevent pressure on the upward side of piston 7 in opposition to the pressure below it. Any leakage from discharge passage 2 into the upper part of cylinder 6 above piston 7 may escape through passage 12 and check valve 11, thence flowing through passage 16 to the discharge.

What we claim is:

A casing having an inlet passage and a discharge passage, a main valve between said passages, a cylinder in said casing below the main valve and at one side of the exhaust portion, a piston in said cylinder, a check valve in said piston, a stem on said main valve extending through the upper head of said cylinder to the piston and connecting said main valve to said piston, a removable plug in the inlet passage opposite the main valve and in line with said main valve, a by-pass in said casing from said inlet passage to said cylinder below said piston, a controlling valve normally closing communication between said inlet passage and said by-pass, means for lifting said controlling valve, a removable plug in the casing opposite and in line with the controlling valve, and a passage from the cylinder below the piston to said exhaust passage, with a valve therein.

In testimony whereof, we have hereunto set our hands at Los Angeles, California, this 23d day of February, 1910.

JOHN L. WILLIAMS.
JOHN C. STURGEON.

Witnesses:
G. T. HACKLEY,
FRANK L. A. GRAHAM.

---

Copies of this patent may be obtained for five cents each, by addressing the "Commissioner of Patents, Washington, D. C."